(No Model.)

W. J. LAWRENCE.
HARROW.

No. 501,012. Patented July 4, 1893.

Witnesses
Clara A. Williams.
Newton G. Leslie.

William J. Lawrence Inventor
By Lucius C. West
Attorney

UNITED STATES PATENT OFFICE.

WILLIAM J. LAWRENCE, OF KALAMAZOO, MICHIGAN.

HARROW.

SPECIFICATION forming part of Letters Patent No. 501,012, dated July 4, 1893.

Application filed March 24, 1892. Serial No. 426,229. (No model.)

*To all whom it may concern:*

Be it known that I, WILLIAM J. LAWRENCE, a citizen of the United States, residing at Kalamazoo, county of Kalamazoo, State of Michigan, have invented a new and useful Harrow, of which the following is a specification.

This invention relates to that class of harrow frames in which are employed revoluble share bars and a lever to operate them for the purpose of throwing (the shares or teeth of) said share bars or tooth bars into and out of the ground and to control the depth of cut.

My object is to operate the revoluble share bars of a frame composed of two hinged sections side by side by one lever common to both, and to this end the invention consists of the below described and claimed construction and association of parts designed to accomplish the above object in a simple, practical and economical manner.

Figure 5:
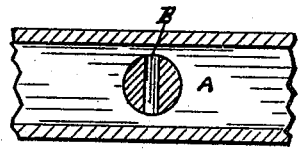
Figure 1:
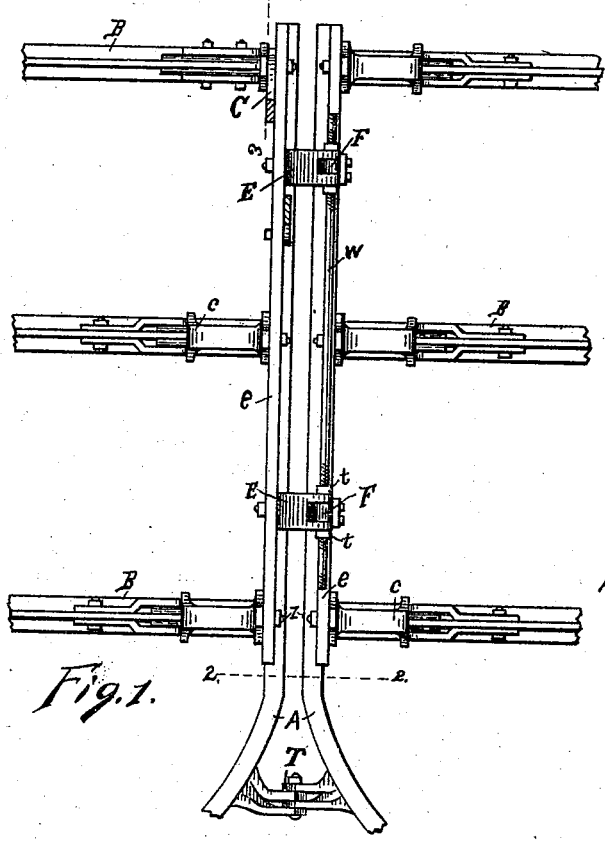
Figure 3:
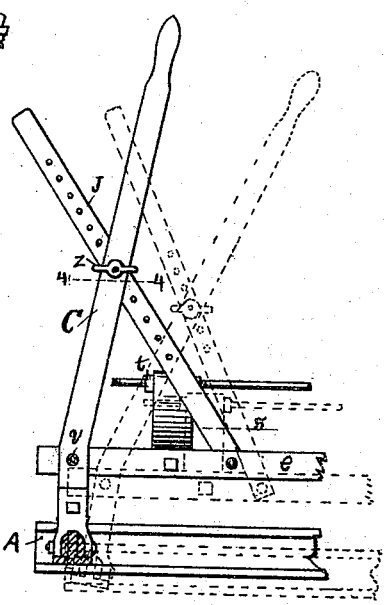
Figure 2:
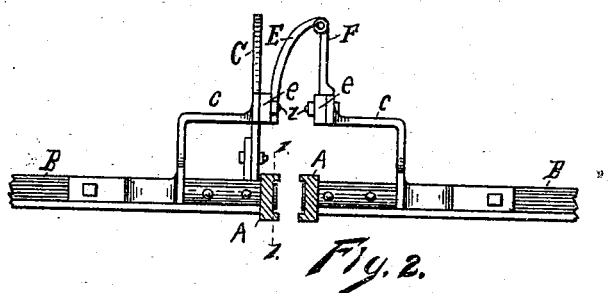
Figure 4:
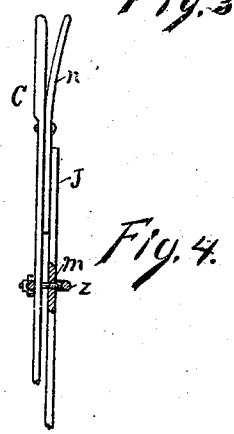

In the drawings forming a part of this specification, Figure 1 is a broken plan view of a two-part harrow frame hinged together, parts being in section on lines 4—4 and 5, in Fig. 3; Fig. 2 a section on line 2—2, in Fig. 1, looking toward the rear end of the harrow frame; Fig. 3 an enlarged section on line 3—3, in Fig. 1, looking from a point at the left; Fig. 4 an elevation of lettered details in Fig. 3, looking from a point at the left; and Fig. 5 is an enlarged section on line 1—1, in Fig. 2, looking from a point at the right.

Referring to the lettered parts of the drawings, A, illustrates the side bars of the sections of a two-part harrow frame. I say a two-part harrow frame for convenience in description, but of course there can be as many sections in the harrow frame as desirable. These bars, A, are continuous around the front end of the harrow frame sections and down the outside, in a complete construction, but are not here shown, as they simply form a bearing for the outer ends of the tooth-bars, B, in the same manner that the bars A, form bearings for the inner ends of said tooth-bars, as here shown, Figs. 1, 2 and 5.

Each section of the harrow frame has a series of transverse tooth-bars, B, the outer ends of which are here shown broken away, and having, as before stated, revoluble bearings at each end in the frame bars A.

The means I have employed for hinging the frame sections together at the center are so connected with the single lever C, that when the tooth-bars, B, of one section are revolved by said lever the action is transmitted to the tooth-bars of the other section, which will be clear from the following detailed description. Projecting upward from the tooth-bars B, near their inner ends, are elbow brackets, c, rigidly attached at their lower ends to said tooth-bars. Horizontal bars, e, are pivotally connected to the upper ends of the brackets c. This pivotal connection is shown at Z, Figs. 1 and 2. To the bar e, of one of the frame sections, at the rear end, is pivotally attached the lever C (at v, Fig. 3) the lower end of said lever being firmly attached to the rear tooth-bar. By carrying this lever forward, it will be readily seen that all of the tooth-bars of this frame section would be partially revolved in their bearings, as indicated by the dotted positions in Fig. 3. Of course the purpose of this is to throw the shares or teeth which would be connected with these tooth-bars, in and out of the soil, or to change their depth of cut, as heretofore. In order to transmit this same action to the tooth-bars, B, of the neighboring frame section, it is hinged to the first named section.

Attached to the horizontal bars, e, are upwardly projecting hinging-arms, E, F. The hinging-arms E, of the frame section to which the lever is attached, are hinged to a rod, w, which rod is attached to the upper ends of the hinging-arms F, of the other section. The hinging-arms E are prevented from slipping on the rod by stops, t t. It will be seen that by this means the action of a single lever common to the tooth-bars of one section will be transmitted to the tooth-bars of other frame sections hinged thereto, through the medium of the hinging means.

The frame-bars and tooth-bars are preferably made of channel or angled metal. As here shown, the tooth-bars are made from what is called T iron or T steel, and the frame-bars of channel iron or channel steel, but this is a matter of choice.

The peculiar construction of the ends of the tooth-bars, B, which have bearings in the frame-bars A, shown in Figs. 1 and 5, is not here described in detail, since it forms the subject of claims in another application bearing even date herewith; the object of Fig. 5 in this case being merely to show that the tooth-bars have revoluble bearings in the frame-bars, A.

While different styles of levers may be employed, I have found the one illustrated in Fig. 3 very satisfactory. It consists of an upright lever, C and an elastic bar, J, loosely confined by loop $z$, which loop is attached to the lever C. The elastic bar J has a series of holes, which catch over a projection, $m$, on the lever C.

At $n$ is a trip, loosely attached to the lever C, and passing between said lever, below its attachment, and the elastic bar J. By grasping the handle of the lever C and the handle of the trip, $n$, and carrying them toward each other, the lower end of the trip throws the elastic bar, J, outward, disengaging it from the projection $m$, at which time the lever can be carried forward or backward. As soon as the lever is released, the elasticity of the bar J will cause it to come back against the lever and one of its holes will slip over the projection $m$, thus locking the parts in the desired position. This lever C may be employed in any frame having revoluble tooth-bars or share-bars, whether composed of hinged sections, or whether one lever operates the share-bars or tooth-bars of more than one section.

The design is to make the hinging means above described of sufficient height that when the lever C is thrown down they will accommodate the height of the bows of spring teeth, when one frame-section is folded over on to the other.

In order to have a rigid connection of the frame-sections endwise, so that one lever can operate the tooth-bars or share-bars of both frame sections, I employ a hinge, T, which will allow the frame-sections to yield up and down independently of each other, but not endwise. The height of this hinge, T, is designed to correspond with the height of the other hinges when the lever C is thrown down.

Having thus described my invention, what I claim as new, and desire to secure by Letters Patent of the United States, is—

1. The combination of the frame-sections, revoluble tooth-bars having upwardly extending brackets near their inner ends, longitudinal bars pivotally attached to the upper ends of the brackets of each section, hinges attached to said longitudinal bars and hinging the frame-sections side by side together, a lever attached to one of said bars, and a hinge directly hinging the frame-sections together, so as to be rigidly attached against endwise movement; substantially as set forth.

2. A frame section having revoluble tooth-bars, a longitudinal bar pivotally attached to said tooth-bars, an operating lever attached thereto, in combination with another frame-section by the side of it and having like tooth bars and longitudinal bar, hinges hinging said longitudinal bars together, and a hinge directly hinging the frame-bars of the sections together, so as to be rigidly attached against endwise movement; substantially as set forth.

3. The combination of a frame section having revoluble tooth-bars, brackets extending upwardly from the inner end of the said tooth-bars, a longitudinal bar pivotally attached to the upper ends of said brackets, hinging arms attached to said longitudinal bar and an operating lever attached to said bar, in combination with another section having like revoluble tooth-bars, brackets, longitudinal bar and hinging arms, a rod attached at the ends to said hinging arms and passing through the eyes of the first named hinging arms, and a hinge directly connecting the frame bars of the sections together, so as to be rigidly attached against endwise movement; substantially as set forth.

4. In a harrow frame, the combination of revoluble share-bars or tooth-bars, upwardly extending brackets attached to said bars, a longitudinal bar pivotally attached to said brackets, and the lever, comprising the lever proper, rigidly attached at its lower end to one of the share-bars or tooth-bars, and pivotally attached to the longitudinal bar, said lever being provided with the locking projection and loop, an elastic bar having a series of perforations and attached at its lower end to the longitudinal bar and passing through said loop by the side of the lever, and the trip between said lever and the elastic bar; substantially as set forth.

In testimony to the foregoing I have hereunto subscribed my name in the presence of two witnesses.

WILLIAM J. LAWRENCE.

Witnesses:
NICHOLAS A. VYNE,
HENRY E. TRUMBLE.